TRANSFORMER CONTROL CIRCUITS FOR FLIP-FLOPS

Filed March 4, 1964

INVENTOR.
JOHN O. PAIVINEN

BY [signature]

ATTORNEY

United States Patent Office 3,307,045
Patented Feb. 28, 1967

3,307,045
TRANSFORMER CONTROL CIRCUITS FOR FLIP-FLOPS

John O. Paivinen, Phoenix, Ariz., assignor to Burroughs Corporation, Detroit, Mich., a corporation of Michigan Filed Mar. 4, 1964, Ser. No. 349,294
12 Claims. (Cl. 307—88.5)

This invention relates to control circuits for transistorized bistable multivibrators commonly referred to as flip-flops and, more particularly, to circuits utilizing a center-tapped transformer driving means for controlling such flip-flops.

The operation of flip-flops in electronic digital computers, as well as in other electronic devices, is well known. A flip-flop has two stable states of conduction. In one state a relatively high voltage is developed at an output terminal and, when triggered to the other conductive state, a relatively low voltage is developed at the same output terminal. The high voltage may be designated either "one" or "zero" depending on the circuit considerations.

In the type flip-flop to which this invention relates, it is necessary to have a trigger pulse coincident with either a set or reset command in order to switch the state of conduction. Further, the trigger pulses, as to any one flip-flop must be of the same polarity when applied to the control circuit and the device must be in an opposite conducting condition from the set or reset command received in order for the output to shift.

In the construction of binary devices such as shift registers, counters, etc., where several flip-flops are used sequentially, the output loading of a trigger pulse generator or clock has been of concern in design considerations. If the clock or trigger pulse generator is overloaded, its output waveform may become distorted causing spurious triggering. All pulse sources have a load limit known as fan-out above which it is impracticable to add more stages to the driven device. Because of this problem, the necessity for an auxiliary source of trigger pulses for multi-stage circuits becomes apparent.

A biphase clock such as a free-running multivibrator produces complementary waveforms. However, previous transistorized flip-flops could accept either the positive-going or the negative-going waveforms, but not both, without internal wiring changes or the use of an inverter.

Therefore, auxiliary sources of trigger pulses have been obtained by the use of pulse amplifiers in combination with clocks and signal inverters, or by having two different type modules in the device, one type utilizing the positive-going pulses and the other type using the negative-going pulses. It can be readily seen that the requirement of pulse inverters, pulse amplifiers or two different type modules not only compounds the problems of design but may also materially increase the cost of a given circuit.

It is, therefore, an object of this invention to improve the control circuits of bistable transistor multivibrators.

Another object of the invention is to provide a bistable multivibrator module that can be connected for triggering by either positive- or negative-going clock pulses.

An additional object of the invention is to provide a universal bistable multivibrator module which will simplify circuitry design in counters, registers, and the like.

Still another object of the invention is to provide a simplified multi-stage binary device utilizing both phases of a complementary pulse source.

In carrying out the above stated objectives, applicant's invention comprises a control circuit having transformer driving means for coupling control signals to a flip-flop circuit, the two circuits forming a module. Both the primary and secondary windings of the transformer driving means have center-tap terminals, the center-tap on the secondary winding always being connected to a reference potential. A terminal also interconnects and is common to steering devices feeding the ends of the primary. Either the center-tap terminal on the primary winding or the terminal interconnecting the steering devices can be used as a clock input, the other terminal being connected to a reference potential. The primary center-tap is used for negative-going pulses and the terminal interconnecting the steering devices utilizes positive-going pulses. Either phase of a complementary pulse source may thus be used with a potential of like polarity being induced in the secondary transformer winding with the resultant output from the flip-flop being logically correct. That is to say, the terminals of applicant's control circuit can be connected to utilize either positive- or negative-going clock pulses with an identical output from the flip-flop.

The novel features of the invention, as well as the invention itself, both as to its organization and method of operation, will best be understood from the following description when read in connection with the accompanying drawings in which.

Figure 1:
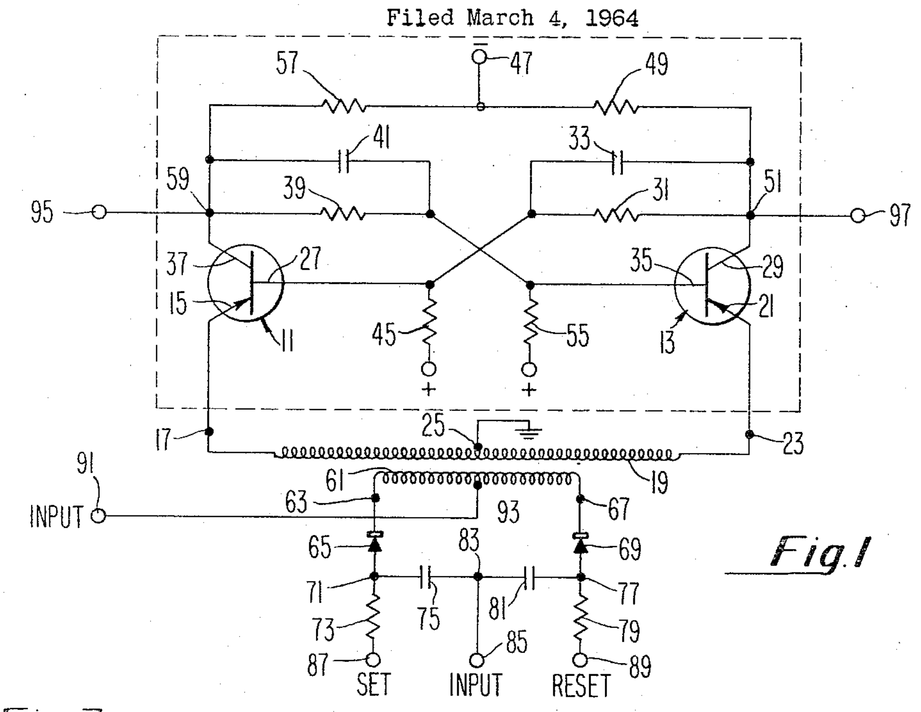
FIG. 1 is a schematic representation of applicant's improved control circuit driving a transistorized flip-flop.

The flip-flop enclosed in the broken lines of FIG. 1 is of a well-known, regeneratively cross-coupled configuration, commonly referred to as the Eccles-Jordan configuration, and includes a pair of transistors 11 and 13 of the PNP type, each having two current-carrying electrodes and a control electrode. The emitter electrode 15 of transistor 11 is connected to terminal 17 while the emitter electrode 21 of transistor 13 is connected to terminal 23.

Base electrodes 27 and 35 of transistors 11 and 13, respectively, are positively biased through voltage dropping resistors 45 and 55, respectively, and cross connected to the collector electrode of the opposite transistor, said cross connections comprising parallel resistive-capacitive circuits including capacitors 41 and 33 and resistors 39 and 31.

A bias voltage 47 is applied to the collectors of transistors 11 and 13 through biasing resistors 57 and 49, respectively. Output terminals 95 and 97 are connected to junctions 59 and 51, respectively, between the collectors 37 and 25, respectively, and their associated cross-coupling circuits and bias voltages.

The control circuit comprises a center-tapped primary transformer winding 61 having end terminals 63 and 67 asymmetrically connected by diodes 65 and 69, respectively, to the output junctions 71 and 77 of a pair of symmetrical capacitance enabling networks. The first of these networks, used as steering devices, consists of resistor 73 and capacitor 75 while the second network consists of resistor 79 and capacitor 81. Capacitors 75 and 81 are connected back to back at junction 83 to which is connected input terminal 85.

A set-input terminal 87 is connected to the free end of resistor 73 while the reset-input terminal 89 is connected to the free end of resistor 79. Another input terminal 91 is connected to the center-tap terminal 93 of transformer winding 61.

The secondary transformer winding 19 is also configured with a center-tap terminal 25 connected to a reference potential such as ground. The ends of the secondary transformer winding 19 are connected to terminals 17 and 23.

Assume now that transistor 11 is conducting and transistor 13 is non-conducting. When transistor 11 is conducting, a relatively high current flows from the collector electrode 37 to the grounded emitter electrode 15 through resistor 57, reducing the potential on collector electrode 37 of transistor 11 substantially to ground. The potential on the base electrode 35 of transistor 13 is positive with respect to emitter electrode 21 at this time due to the current flow through the resistors 39 and 55. In this condition there is current flow between terminals 25 and 17 of the center-tapped secondary transformer winding 19 and there is no current flow between terminals 25 and 23 of said winding 19.

Assume now that input terminal 85 in the control circuit is connected to a ground potential and that input terminal 91 is connected to a source of negative-going clock pulses, which may go from ground to minus five volts, for example.

In this configuration, the quiescent levels of the set and reset terminals must be at least as negative as minus five volts. If both terminals 87 and 89 are at minus five volts, the capacitors 75 and 81 are charged to that level. When a positive-going pulse of 5 volts magnitude is applied to reset terminal 89, a potential is impressed across capacitor 81 thereby charging capacitor 81 to zero volts. When the negative-going clock pulse is applied to terminal 91, current flows through the center tap 93 of the center-tapped primary transformer winding 61, through terminal 67 and across diode 69 to capacitor 81.

As a result of the winding direction of the transformer, the change in potential developed between terminals 93 and 67 induces a potential of like polarity in the secondary transformer winding 19.

In this situation a positive potential with respect to a reference voltage is applied through secondary transformer winding 19 to terminal 23. This positive potential initiates the turning on of transistor 13. Conversely, a negative potential with respect to a reference voltage is applied to terminal 17 which tends to turn off transistor 11. These induced potentials are aided by the cross coupling network interconnecting the respective bases and collectors of transistors 11 and 13.

While transistor 11 was conducting there was a relatively high voltage output at terminal 95 and a relatively low output at terminal 97 due to the non-conduction of transistor 13. When transistor 13 turns on and transistor 11 turns off, a relatively high potential is developed at output terminal 97 and a relatively low potential developed at terminal 95 due to the turning off of transistor 11.

It will be noted that the potential impressed across the secondary winding affects the entire winding, and in so doing not only initiates the switching on of the non-conducting transistor, but also initiates the switching off of the conducting transistor. This results in a decrease in switching time.

When a set pulse is applied to terminal 87 unblocking diode 65 and a negative-going pulse is applied to terminal 91, the control circuit will act in altering the charge of capacitor 75 to actuate a current through winding 61 between terminals 93 and 63 in the reverse direction to that initiated by the reset pulse to once more change the state of the flip-flop.

A current flow in the same direction through either half of the primary winding 61 produces current in the same direction in the secondary winding 19. In order to use a positive-going clock pulse, therefore, it is necessary only to reverse the connections at terminal 85 and terminal 91, that is, to connect the source of positive-going clock pulses to input terminal 85 and to connect terminal 91 to a ground reference potential.

In this configuration when a positive-going set pulse is applied to terminal 87 rising to ground from its quiescent minus five volt level, capacitor 75 charges to zero volts thereby unblocking diode 65. When the positive-going clock pulse is applied at the terminal 85, current flows through the center tap 93 of the primary transformer winding 61, through terminal 63 across diode 65 to again alter the charge on capacitor 75. It will be noted that current flow through the primary transformer winding 61 is in the same direction for a set pulse regardless of whether the negative-going clock pulses are applied at terminal 91 or positive-going pulses to terminal 85. Therefore, the center-tapped secondary of transformer winding 19 senses no difference in the two methods of circuit control.

Likewise when a positive-going reset pulse is applied to terminal 89 a potential is impressed across capacitor 81 thereby unblocking diode 69. The application of a positive-going clock pulse at terminal 85 causes current flow through the center tap 93 of the primary transformer winding 61, through terminal 67 across diode 69 to capacitor 81. Again the center-tapped secondary of transformer winding 19 senses no phase difference between the two methods of circuit control, although it is readily observed that current flows oppositely through the primary depending upon whether a set or reset positive-going signal is applied.

Applicant's control circuit can be conveniently packaged with its flip-flop to form a universal module adapted to be connected to either positive or negative-going pulses as desired.

Although applicant's control circuit has been shown in the environment of a specific flip-flop using PNP transistors, it will be understood by those skilled in the art that the inventive principles taught herein are equally applicable in driving other types of non-complementary electronic bistable devices. When positive quiescent set and reset levels are used, the diodes must be reverse-poled as is well understood. Likewise other types of steering devices, known in the art, may be substituted for the type described.

Figure 2:
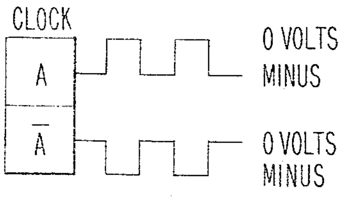
FIG. 2 represents a typical waveform generated by a clock device.

The waveform shown in FIG. 2 is illustrative of the complementary waveform generated by triggering devices. Since the loads applied or the loads driven by these pulse trains are basically capacitive, when overloading takes place the square wave generated will become ragged on its leading and trailing edges, resulting in the possibility of spurious triggering or triggering of none of the devices.

Figure 3:
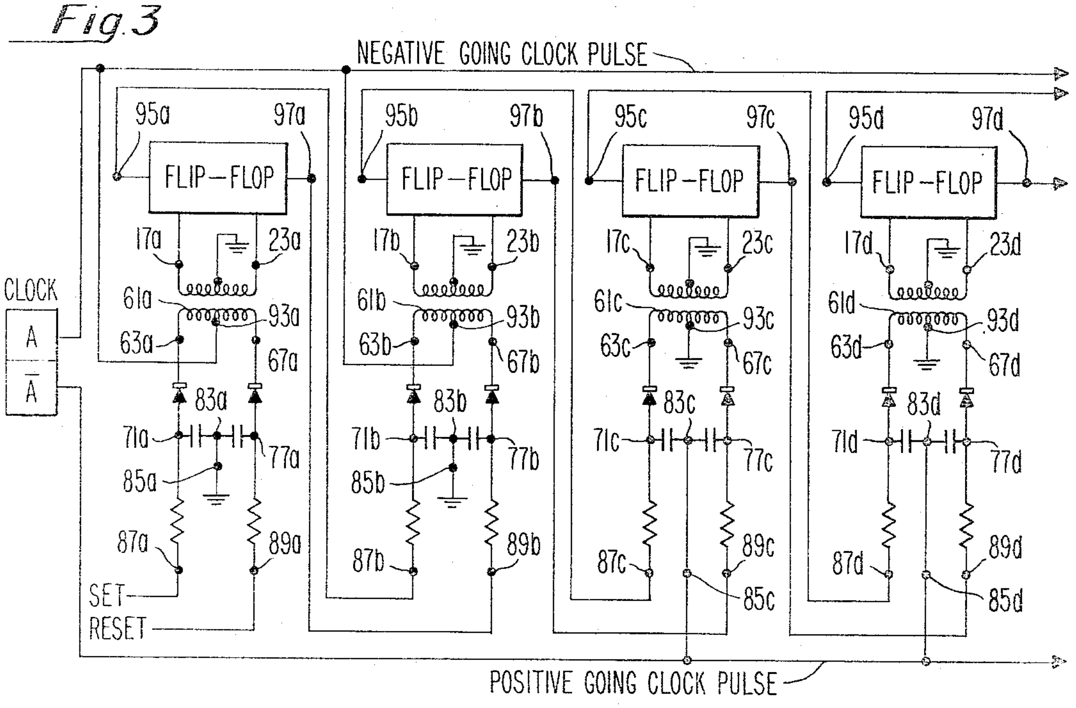
FIG. 3 is a schematic representation of a four-stage shift register utilizing both phases of a complementary pulse source under the principles of applicant's invention.

FIG. 3 is a schematic representation of a new shift register incorporating applicant's control circuit wherein both positive and negative-going clock pulses are utilized directly from the clock source. In the first two stages the primary center tap terminals **93*a* and 93*b* are connected to utilize the negative-going pulses of a clock source. Terminals 85*a* and 85*b* are, therefore, connected to a reference potential such as ground. In the third and fourth stages terminals 85*c* and 85*d* are connected to utilize the positive-going pulses of the clock source. In this configuration, terminals 93*c* and 93*d* of center-tapped primary windings 61*c* and 61*d*** are connected to a source of reference potential such as ground. The module may also include a switch connected to the center tap of the primary and intermediate the capacitors so as to connect selectively to either ground or to the trigger source as desired. Likewise it is understood that a single phase clock may be adequate.

It is apparent that the number or order of stages in any one mode is a matter of convenience or design consideration.

A source of positive-going set and reset signals having a negative quiescent level is connected to terminals **87*a* and 89*a*. Output terminal 95*a* is connected to set input terminal 87*b* while output terminal 97*a* is connected to reset input terminal 89*b***. Likewise, the high level output of the flip-flop is connected to the set input of the control circuit while the low level output is connected to the reset terminal of the control circuit in each successive stage.

The other components of applicant's shift register bear the same identifying numerals as those used in FIG. 1 and serve the same control functions.

In both the flip-flop of FIG. 1 and the shift register of FIG. 3, the RC time constant 73, 75 or 79, 81 may be so chosen that an entire pulse period is necessary to charge the capacitor. In this fashion, spurious triggering cannot occur during a specific clock pulse. It is also noted that in the shift register, the RC constant between stages is sufficiently great to provide a delay in the transmission from one stage to another. This is necessary so that the advance pulses may be applied to all stages in parallel.

Applicant's cascaded multi-stage binary device, illustrated as a shift register, utilizes a single rule of operation wherein a plurality of identical flip-flops and transformer control circuits are connected to a clock source to utilize both the positive-going and negative-going pulses without inverters or other auxiliary devices. Applicant's control circuit can, of course, be utilized equally well in reversible counters, ring counters, and other such multi-stage binary devices.

I claim:

1. In a transistorized bistable multivibrator of the Eccles-Jordan type, having a pair of transistors each with two current-carrying electrodes and a control electrode, transformer driving means comprising a primary winding having two end terminals and a center-tap terminal, a pair of asymmetrically conductive means, a pair of capacitive enabling networks coupled to individual ones of said end terminals through said asymmetrically conductive means, a common junction between said capacitive enabling networks, a secondary winding having two end terminals and a center-tap terminal, said end terminals of said secondary winding being connected to like electrodes of said transistors and said center-tap terminal of said secondary winding being connected to a reference potential, whereby the receipt of a conditioning pulse by one of said enabling networks conditions the asymmetrically conductive means coupled to said one enabling network for conduction upon the occurrence of an input pulse.

2. In an electronic device having a biphase pulse source, a plurality of regenerative flip-flops and an input source of set and reset pulses, a control system comprising transformer driving means for each of said flip-flops, each said means having a primary and a secondary winding, a center-tap terminal and end terminals on each of said primary and secondary windings, asymmetrically conductive means, a pair of capacitive enabling circuits individually connected to the end terminals of said primary winding through said asymmetrically conductive means for each of said driving means, said enabling circuits having a common junction, means for connecting said end terminals of said secondary winding of each of said driving means as inputs for its associated flip-flop, means for connecting said pairs of symmetrical capacitive enabling circuits to appropriate sources of set and reset pulses, said transformer driving means of at least one of said flip-flops having its primary center-tap connected to said biphase source and said common junction of its capacitive enabling circuits connected to a reference potential, and said transformer driving means of at least one other of said flip-flops having its primary center-tap connected to a reference potential and said common junction of its capacitive enabling circuits, connected to said biphase source.

3. In a multivibrator circuit including a pair of electron devices, each having two current-carrying electrodes and a control electrode, said pair having regeneratively arranged feedback networks wherein, when one of the devices is in its so-called conducting or low-impedance condition, the other device is in its nonconducting or high-impedance condition and wherein the device remains in one quiescent state until its switching action is initiated by the application of a voltage pulse and a trigger pulse which causes the circuit to assume the other quiescent state, a control circuit comprising a transformer having a tapped primary and a tapped secondary winding, means connecting the secondary tap to a source of reference potential, means connecting the ends of said secondary winding individually to like current-carrying electrodes of said electron devices, a pair of symmetric capacitive enabling circuits having individual terminals and a common terminal, asymmetric means individually coupling the outputs of said enabling circuits to the ends of said primary winding, whereby application of a trigger pulse to either said common terminal or said primary tap, in either case the other being connected to a reference potential, coincident with the application of a predetermined voltage charge across the capacitor of one of said enabling circuits, resulting from the application of a voltage pulse to one of said individual terminals of said enabling circuits, induces a current in said primary winding on one side of said primary tap.

4. In combination with a transistorized bistable multivibrator, transformer driving means for selectively controlling said multivibrator comprising center-tapped primary and secondary windings, terminal means at the ends and center taps of said transformer windings, means for connecting said secondary center-tap terminal to a reference potential, means for connecting said secondary end terminals to said multivibrator, asymmetrically conductive means, a coupling network having at least a pair of symmetrical capacitive enabling circuits individually connected to said end terminals of said primary transformer winding through said symmetrically conductive means, said enabling circuits being joined at like ends in a common terminal, individual means for applying set and reset commands to the other ends of said symmetrical enabling circuits, means for receiving trigger pulses at either said primary center tap terminal or said common terminal, in either case the other being connected to a reference potential, whereby positive or negative-going trigger pulses may be used to selectively establish the state of said bistable multivibrator.

5. Transformer driving means according to claim 4 in which each of said symmetrical enabling circuits comprises a resistor and a capacitor, connected in series, said capacitors of said pair of circuits being connected back to back.

6. A control system according to claim 2 in which each of said symmetrical capacitive enabling circuits comprises a resistor and capacitor connected in series, said capacitors of said pair of enabling circuits being connected back to back.

7. In a multi-stage electronic device utilizing non-complementing flip-flops and a biphase trigger pulse source, a control system comprising a transformer for each of said flip-flops, each said transformer having its primary and secondary center-tapped and having the ends of its secondary serving as inputs for its associated flip-flop, asymmetric devices connected to the ends of each of the primaries of said transformers, a pair of back to back capacitors connected across said primaries of each of said transformers outwardly from said asymmetric devices for conditioning one of said asymmetric devices for conduction upon the receipt of a set or a reset pulse, each of said pair of capacitors having a junction therebetween, a direct connection between said center-tap of the primary of at least one of said transformers and one phase of said trigger pulses, said junction of said capacitors connected thereacross being connected to a reference potential, and a direct connection between said junction of said pair of capacitors of at least one other of said transformers and the other phase of said trigger pulse source, the center-tap of said primary of said other transformer being connected to a reference potential.

8. A control circuit for a cascaded multi-stage electronic device utilizing non-complementary flip-flops and a biphase trigger pulse source comprising a transformer individual to each of said flip-flops, the secondary of said transformer being connected across the inputs of its associated flip-flop and having a point intermediate said inputs connected to a reference potential, unidirectionally conductive means, individual capacitors connected on one side through said unidirectionally conductive means to each end of each of the primaries of said transformers for conditioning one of said undirectionally conductive means for conduction upon the receipt of a conditioning pulse by one of said capacitors, said capacitors forming pairs for each transformer, means for directly connecting the other sides of at least one of such pairs of capacitors to pulses of one phase from said biphase pulse source, a point intermediate the ends of the primary associated with said one pair being connected to a reference potential, means for connecting the other sides of at least one other of such pairs of a reference potential, means for directly connecting a point intermediate the ends of the primary associated with such one other pair of pulses of the other phase of said biphase pulse source, and circuit means for charging the capacitors of each of said pairs.

9. The combination of claim 8 wherein the pairs of capacitors for the transformer of each flip-flop after the first stage are charged by the outputs of the flip-flop of the stage preceding.

10. A flip-flop electrical circuit comprising two electron amplifying devices included in separate current paths, control electrodes for each of said amplifying devices said control electrodes being cross-connected to the respective opposite current paths, a pair of diodes, a pair of series-connected capacitors having a junction there between, a secondary winding having its ends coupled to said electron devices, a primary winding mutually inductively coupled to said secondary winding having two end terminals and an intermediate terminal, and end terminals being connected through said pair of diodes to the other ends of said pair of capacitors, a trigger source connected between said intermediate terminal and said junction, a pair of resistors, a set of reset voltage source connected through individual ones of said resistors to the outer ends of said capacitors, the time constant of each resistor-capacitor combination connected to the set and reset sources being sufficiently long to permit said flip-flop to reverse its conduction state without multiple triggering upon receipt of a trigger pulse subsequent to a reversal of set and reset voltage levels.

11. A shift register including a plurality of flip-flop circuits as defined in claim 10, the set and reset voltage levels of each stage after the first being diverted from the respective current paths of a preceding stage and said trigger source being connected in common to each said flip-flop circuit.

12. A circuit for controlling a bistable multivibrator comprising a transformer having centertapped primary and secondary windings, the ends of said secondary winding being connected to said multivibrator for switching said multivibrator from one state to the other and back again, the centertap of said secondary winding being connected to a point of reference potential, a pair of unidirectionally conductive devices, capacitive enabling means coupled to the ends of said primary winding through said unidirectionally conductive devices for conditioning said primary winding upon receipt of a conditioning pulse by said enabling means for conduction in different halves thereof and in opposite senses, and terminal means for said enabling means and the centertap of said primary winding for energizing the half of said primary winding enabled by said capacitive means, only one of said terminal means being energized at a time.

References Cited by the Examiner

UNITED STATES PATENTS

| | | | |
|---|---|---|---|
| 2,622,212 | 12/1952 | Anderson et al. | 305—88.5 |
| 2,977,485 | 3/1961 | Olsen | 307—88.5 |
| 2,988,701 | 6/1961 | Clapper | 307—88.5 |
| 3,132,265 | 5/1964 | Welken et al. | 307—88.5 |
| 3,143,664 | 8/1964 | Lourie et al. | 307—88.5 |
| 3,191,059 | 6/1965 | Guarracino | 307—88.5 |

ARTHUR GAUSS, *Primary Examiner.*

J. HEYMAN, *Assistant Examiner.*

UNITED STATES PATENT OFFICE

CERTIFICATE OF CORRECTION

Patent No. 3,307,045 February 28, 1967

John O. Paivinen

It is certified that error appears in the above identified patent and that said Letters Patent are hereby corrected as shown below:

Column 7, line 31, for "undirectionally" read -- unidirectionally --; line 42, for "of", second occurrence, read -- to --; line 45, for "of", first occurrence, read -- to --; column 8, line 7, for "and", second occurrence, read -- said --; line 23, for "diverted" read -- derived --.

Signed and sealed this 15th day of July 1969.

(SEAL)
Attest:

Edward M. Fletcher, Jr.
Attesting Officer

WILLIAM E. SCHUYLER, JR.
Commissioner of Patents